United States Patent [19]
Patzig et al.

[11] Patent Number: 5,741,417
[45] Date of Patent: Apr. 21, 1998

[54] SYSTEM FOR BIOLOGICALLY TREATING WASTEWATER

[75] Inventors: Jürgen Patzig, Chemnitz; Jürgen Lüddeke, Neustadt, both of Germany

[73] Assignee: List Abwassertechnik GmbH, Chemnitz, Germany

[21] Appl. No.: 690,338

[22] Filed: Jul. 26, 1996

[30]  Foreign Application Priority Data

Oct. 20, 1995 [DE] Germany .................. 195 39 042.3

[51] Int. Cl.$^6$ ........................................ C02F 3/30
[52] U.S. Cl. .................. 210/202; 210/220; 210/299; 210/532.2; 210/605
[58] Field of Search .............. 210/202, 220, 210/258, 259, 299, 532.2, 532.1, 605, 499

[56]  References Cited

U.S. PATENT DOCUMENTS

| | | | |
|---|---|---|---|
| 2,071,591 | 2/1937 | Tholin | 210/616 |
| 2,987,186 | 6/1961 | Burgoon et al. | 210/532.2 |
| 3,543,294 | 11/1970 | Boester | 210/220 |
| 3,764,525 | 10/1973 | Goodman et al. | 210/499 |
| 3,834,536 | 9/1974 | Kelsey | 210/220 |
| 3,892,659 | 7/1975 | Kirk | 210/195.3 |
| 3,964,998 | 6/1976 | Barnard | 210/903 |
| 4,322,296 | 3/1982 | Fan et al. | 210/610 |
| 4,689,145 | 8/1987 | Mathews et al. | 210/299 |
| 5,288,407 | 2/1994 | Bodwell et al. | 210/903 |
| 5,624,562 | 4/1997 | Seroggins | 210/605 |

FOREIGN PATENT DOCUMENTS 34 05 236 A1   2/1984   Germany .
41 43 376 A1   6/1991   Germany .

OTHER PUBLICATIONS

Din No. 4261 Part II Jun. 1984.

*Primary Examiner*—Christopher Upton
*Attorney, Agent, or Firm*—Collard & Roe, P.C.

[57]  ABSTRACT

A system for treating wastewater using the activated sludge biological process by retaining and degrading biodegradable coarse solids. A receiving well contains both a pre-separator stage and an activation chamber arranged one after the other in a direction of through-flow. The preseparator stage has a sand catcher located at the bottom for receiving undegradable solids. A partition is disposed within the receiving well between the pre-separator stage and the activation chamber. A lower section of the partition is a wall separating the sand catcher from the activation chamber. At least a portion of the upper section of the partition is a screen that is inclined with respect to a vertical line, into the activation chamber by greater than 0° up to 30° to widen a space of said pre-separator stage above the sand catcher.

11 Claims, 1 Drawing Sheet

SYSTEM FOR BIOLOGICALLY TREATING WASTEWATER

BACKGROUND OF THE INVENTION

1. Field of the Invention

The present invention relates to a system for treating municipal, industrial or agricultural wastewater. More particularly, it relates to treating wastewater using the activated sludge biological process by retaining and degrading biologically degradable, coarse solids.

2. The Prior Art

Wastewater treatment facilities are known which consist of a pre-separator having a sand catcher arranged at the bottom, and a biological reactor equipped with a ventilation device. The pre-separator and the ventilation chamber can also be components of a larger plant, for example with a further settling tank arranged downstream. Known installations, for example small clarifier installations with wastewater aeration according to DIN 4261, Part 2, have settling tanks, in which all settleable solids are retained and the biodegradable substances are degraded under anaerobic conditions. The anaerobic degradation leads to acidification of the wastewater and to the formation of cellular poisons such as methane and ammonia, which inhibit the further biodegradation with activated sludge. The degradation products may lead to annoying odors at the site and explosive gas mixtures in the plant. Furthermore, the anaerobic and aerobic stages of the system produce different qualities of sludge, which is a disadvantage.

German Patent DE-OS 4143,376 describes a compact plant for the separation and removal of screened materials and sand from feed conduits, particularly for clarifiers. The plant has a grid or screen, as well as a conveyor screw for separating the screened materials, and a classifying conveyor with a conveyor screw for discharging the sand. The material separated by the mechanical screen has to be disposed of separately from the other sludge. It is also known to wash the separated material in order to prevent annoying odors. The water used to wash the material is reintroduced into the clarifier. This, however, leads to an increased hydraulic load on the further clarifiers.

A system for purifying wastewater, in particular municipal wastewater, as well as treating the produced sludge is known from German Patent DE-OS 3,405,236. In order to avoid the aforementioned drawbacks, the separation of coarse and undegradable components of the wastewater is omitted. The first biological reactor stage is used as a ventilated sand catcher. This causes a concentration of undegradable materials such as sand and plastic in the first biological reactor which poses the risk of damage to the ventilators or clogging of the ventilator surface. A retaining grid upstream of the second biological reactor is subject to clogging as well and thus may interfere with the normal process in the clarifier. If, on the other hand, a trickling filter is used in the second biological reactor stage, the risk of clogging is far greater.

SUMMARY OF THE INVENTION

It is therefore an object of the present invention to overcome the drawbacks of the prior art and to provide a system for treating wastewater in which part of the preseparator is used simultaneously as a biological reactor to reduce volume, increase the efficiency of the system and reduce costs.

These and other related objects are achieved according to the invention by retaining the coarse solids of the wastewater in a compact installation and collecting the undegradable materials. The degradable substances are broken down enzymatically under different environmental conditions, and fed into the biological reactor for further degradation.

The system according to the invention treats wastewater using the activated sludge biological process by retaining and degrading biodegradable coarse solids contained in the wastewater. A receiving well contains a pre-separator stage and an activation chamber arranged one after the other in a direction of through-flow of the wastewater. The preseparator stage has a sand catcher disposed at its bottom for receiving undegradable solids. The activation chamber has a ventilation device located therein. A partition is disposed within the receiving well between the pre-separator stage and the activation chamber. A lower section of the partition comprises a wall separating the sand catcher from the activation chamber. At least a portion of the upper section of the partition comprises a screen for retaining coarse solids in the pre-separator stage. The screen is inclined with respect to a vertical line into the activation chamber, by greater than 0° up to 30° so that the pre-separator stage is widened in an area above the sand catcher. Ideally, the screen is inclined 10°.

In a first embodiment, a top portion of the upper section is a screen, and a bottom portion of the upper section is a further wall. The pre-separator stage contains a top aerobic zone, a middle anoxic zone and a bottom anaerobic zone, wherein the zones are layered within the pre-separator stage without clearly-delineated phase separation. The coarse solids retained by the screen are within the aerobic zone. Air from the ventilation device passes through the screen to strip the coarse solids from the screen and partly circulation wastewater within the pre-separator stage. As a result, the coarse solids within the pre-separator stage are broken down enzymatically under various environmental conditions within the layered zones.

In a second embodiment, the entire upper section is a screen which extends from a surface of the wastewater in the receiving well down to a level of the ventilation device and the activation chamber. The pre-separator stage contains an aerobic zone layered above a relatively small anoxic zone, wherein the coarse solids retained on the screen are broken down enzymatically, exclusively under aerobic conditions.

In a third embodiment, the bottom portion of the upper section is a screen which extends upwardly from a level of the ventilation device. A further ventilation device is optionally-disposed within the pre-separator stage, for example a top portion of the pre-separator. A top portion of the upper section is a further wall between the pre-separator stage and the activation chamber. The pre-separator stage contains an aerobic zone layered above a relatively small anoxic zone. The coarse solids retained on the screen are broken down enzymatically exclusively under aerobic conditions. The further ventilation device is on the same level as the bottom of the further wall to provide air to the aerobic zone. The activation chamber is a biological reactor where oxygen-dependent biological processes break down solids in the wastewater.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF PREFERRED EMBODIMENTS

Figure 1:
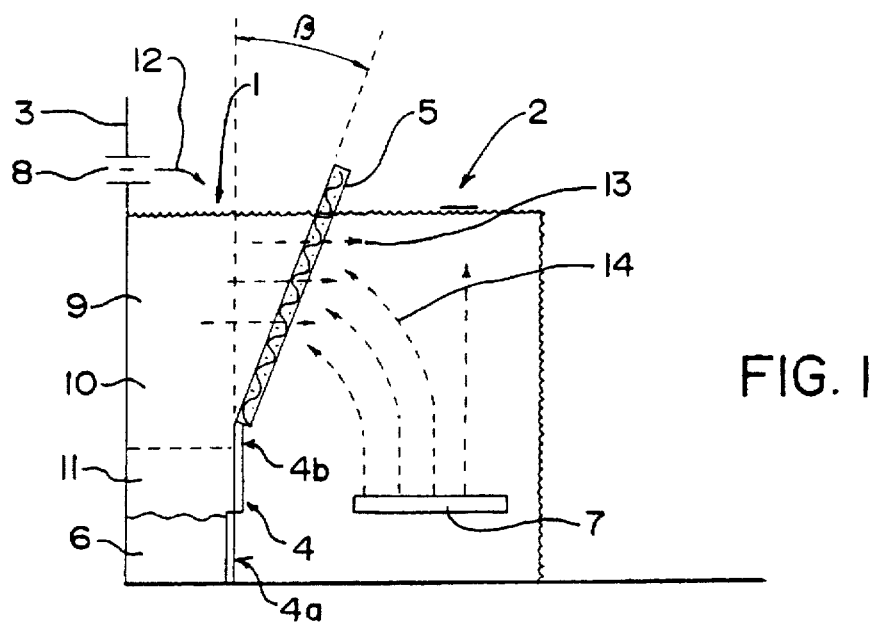
FIG. 1 is a schematic diagram showing a treatment system according to the invention with a partition having an upper screen portion located between a pre-separator and a biological reactor.
Figure 2:
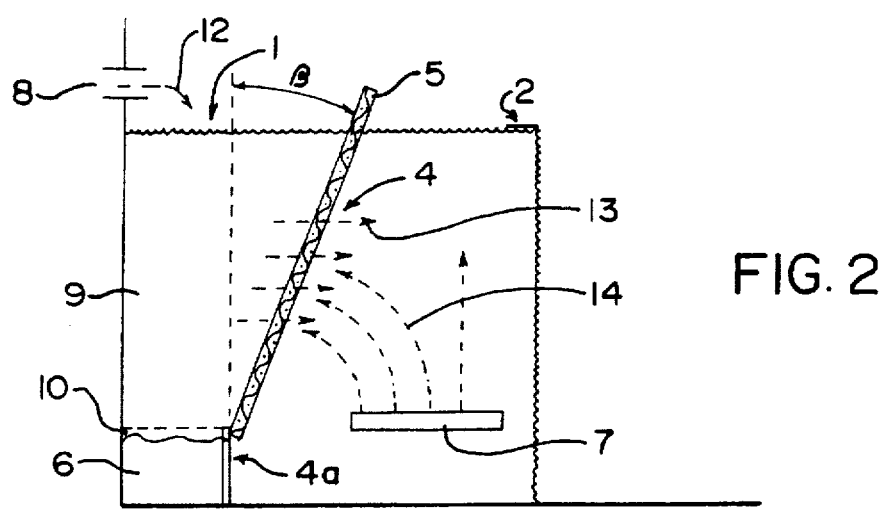
FIG. 2 is another schematic view of the system with the entire partition designed as a screen.
Figure 3:
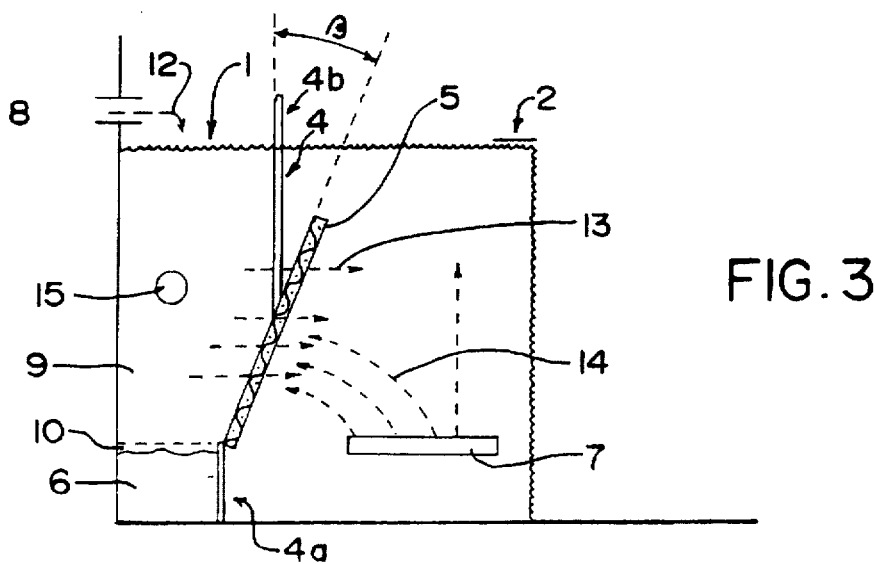
FIG. 3 is a further schematic view of the system with the lower section of the partition designed as a screen with an additional ventilator arranged in the pre-separator.

Turning now in detail to the drawings, the clarifying plants shown in FIGS. 1 to 3 comprise a receiving well 3 containing a pre-separator stage 1 and an activation chamber or biological reactor 2. In each case, additional activation stages or biological reactors (not shown) and/or further settling stages can be connected. Pre-separator stage 1 and biological reactor 2 are separated by a partition 4. Partition 4 includes a lower wall section 4a. Partition 4 also includes a wall section 4b in the embodiments of FIGS. 1 and 3 and a screen 5 in all three embodiments. Partition 4 above lower wall section 4a is wholly designed as a screen or grid 5 as shown in FIG. 2, or partly designed as a screen as shown in FIGS. 1 and 3.

Influent wastewater is supplied to pre-separator stage 1 by way of infeed 8 in the direction of arrow 12. The small and dissolved solids, after flowing with the wastewater through screen 5 as indicated in the direction of arrows 13, are directly received in biological reactor 2. Screen or grid 5 consists of rods, a grate, or a perforated plate. Screen 5 is inclined at an angle "beta" into biological reactor 2, which widens the area of pre-separator stage 1 above sand catcher 6. Sand catcher 6 is closed off laterally from biological reactor 2 by lower wall section 4a. The inclination angle "beta" ranges from 0° to 30°, preferably 10°. Screen 5 retains the coarse solids of the wastewater. The biologically undegradable and specifically heavy solids such as sand predominantly settle on the bottom of preseparator stage 1 and are received in sand catcher 6, which is laterally separated from biological reactor 2 by lower wall section 4a. The contents of the sand catcher 6 can be pumped off from time to time and transferred into sludge storage (not shown). Such contents do not load biological reactor 2 or a further settling stage (not shown) arranged downstream.

A ventilation device 7 is arranged in biological reactor 2. The air blown in by ventilation device 7 rises as indicated in the direction of arrows 14. Some of the air passes through the angled screen 5 and ventilates the part of pre-separator stage 1 that is disposed above screen 5. As a result, the wastewater contained in pre-separator stage 1 is partly circulated. At the same time the air acts as a stripper for the coarse contaminations retained on screen 5, which slide back down into pre-separator stage 1.

In FIG. 1, screen 5 extends from the surface of the wastewater to the top of wall section 4b above the level of ventilating device 7. The solids within pre-separator stage 1 are broken up enzymatically under various environmental conditions within an aerobic zone 9, an anoxic zone 10 and an anaerobic zone 11. These zones are layered in pre-separator stage 1 one on top of the other, but without strict phase separation. Aerobic zone 9 is a zone in which bacteria requiring oxygen metabolically break down materials. Aerobic bacteria oxidize under catalytic fermentation to degrade organic nutrients into simpler compounds, i.e. mineralization. Aerobic bacteria are very important for wastewater purification (of solids) and self-purification of bodies of water. Anoxic zone 10 is a zone totally deprived of oxygen. Anaerobic zone 11 is a zone where bacteria, which can survive in the partial or complete absence of air, break down materials. Anaerobic bacteria are facultative bacteria (for example, coli bacteria) and obligatory (compulsive) anaerobic bacteria (for example, methane bacteria). Anaerobic bacteria assist in sludge digestion (i.e. putrid mud). Subsequently, the solids retained by screen 5 are disposed primarily within the range of aerobic zone 9 in biological reactor 2. In each case, the lower range of aerobic zone 9 is approximately even with the bottom of screen 5 because this is the lowest level where oxygen enters pre-separator stage 1.

In FIG. 2, screen 5 extends from the wastewater surface down to the level of ventilation device 7. Aerobic zone 9 in pre-separator stage 1 is, accordingly, adjusted larger versus anoxic zone 10 and anaerobic zone 11, if any. The coarse solids are broken down enzymatically exclusively under aerobic conditions. Once broken down, the solids pass through screen 5 to biological reactor 2 for degradation like fine and dissolved solids which are present in the influent wastewater.

In FIG. 3, screen 5 is arranged adjacent and below upper wall section 4b and extends down to the level of ventilation device 7. Air from ventilation device 7 is partially blocked by upper wall section 4b from entering preseparator stage 1. Providing air to aerobic zone 9 may be enhanced by arranging a further ventilation device 15 in the upper part of pre-separator stage 1, even with the bottom of wall 4b. This further ventilator blows in a limited amount of air.

While several embodiments of the present invention have been shown and described, it is to be understood that many changes and modifications may be made thereunto without departing from the spirit and scope of the invention as defined in the appended claims.

What is claimed is:

1. A system for treating wastewater using the activated sludge biological process by retaining and degrading biodegradable coarse solids contained in the wastewater comprising:

a receiving well containing a pre-separator stage and an activation chamber arranged one after the other in a direction of through-flow of the wastewater;

said pre-separator stage having a sand catcher disposed at its bottom for receiving undegradable solids;

said activation chamber having a ventilation device; and a partition, with an upper and lower section, disposed within said receiving well between said pre-separator stage and said activation chamber, said lower section comprising a wall separating said sand catcher from said activation chamber, at least a portion of said upper section comprising a screen for retaining coarse solids in said preseparator stage, wherein said screen is inclined with respect to a vertical line into said activation chamber, by greater than 0° up to 30° so that said pre-separator stage is widened in an area above said sand catcher.

2. The system according to claim 1, wherein said screen is inclined at 10°.

3. The system according to claim 1, wherein a top portion of said upper section is said screen, and a bottom portion of said upper section is a further wall between said pre-separator stage and said activation chamber.

wherein said pre-separator stage contains (i) an aerobic zone, (ii) an anoxic zone below said aerobic zone, and (iii) an anaerobic zone below said anoxic zone, wherein the zones are layered on top of each other within said pre-separator stage without clearly defined phase separation between zones.

4. The system according to claim 3, wherein the coarse solids retained by said screen are within the aerobic zone, whereby air from said ventilation device passes through the screen to strip the coarse solids from the screen and partly circulate wastewater within said pre-separator stage so that the coarse solids within said pre-separator stage are broken down enzymatically under various environmental conditions within the layered zones.

5. The system according to claim 1, wherein the entire upper section is a screen which extends from a surface of the wastewater in said receiving well down to a level of said ventilation device in said activation chamber.

6. The system according to claim 5, wherein said pre-separator stage contains an aerobic zone layered above a relatively small anoxic zone, wherein the coarse solids retained on said screen are broken down enzymatically, exclusively under aerobic conditions.

7. The system according to claim 1, wherein a bottom portion of the upper section is a screen extending upwardly from a level of said ventilation device.

8. The system according to claim 7, comprising a further ventilation device disposed within said pre-separator stage.

9. The system according to claim 8, wherein said further ventilation device is disposed within a top portion of said pre-separator stage.

10. The system according to claim 9, wherein a top portion of the upper section is a further wall between said pre-separator stage and said activation chamber, wherein said pre-separator stage contains an aerobic zone layered above a relatively small anoxic zone, wherein the coarse solids retained on said screen are broken down enzymatically, exclusively under aerobic conditions, said further ventilation device being on the same level as a bottom of said further wall to provide air to the aerobic zone.

11. The system according to claim 1, wherein said activation chamber is a biological reactor where oxygen from said ventilator device helps oxygen-dependent biological processes break down solids in the wastewater.

* * * * *